W. A. OLSEN.
NAILING MACHINE.
APPLICATION FILED JUNE 28, 1907.

916,768.

Patented Mar. 30, 1909.
6 SHEETS—SHEET 1.

WITNESSES

INVENTOR
William A. Olsen,
BY
Victor J. Evans
ATTORNEY

W. A. OLSEN.
NAILING MACHINE.
APPLICATION FILED JUNE 28, 1907.

916,768.

Patented Mar. 30, 1909.
6 SHEETS—SHEET 3.

Witnesses:
James F. Duhamel
H. F. Dieterich

Inventor,
William A. Olsen,
By his Attorney
Victor J. Evans

W. A. OLSEN.
NAILING MACHINE.
APPLICATION FILED JUNE 28, 1907.

916,768.

Patented Mar. 30, 1909.
6 SHEETS—SHEET 4.

W. A. OLSEN.
NAILING MACHINE.
APPLICATION FILED JUNE 28, 1907.
916,768.
Patented Mar. 30, 1909.
6 SHEETS—SHEET 5.
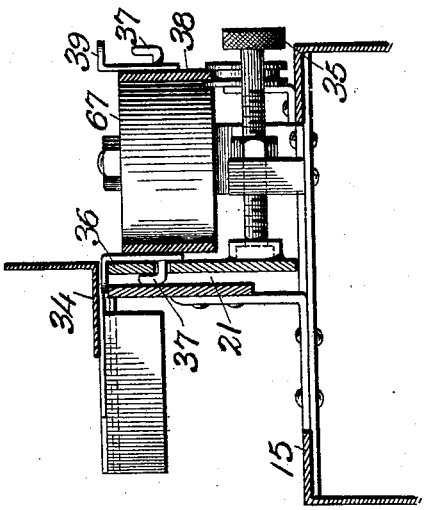
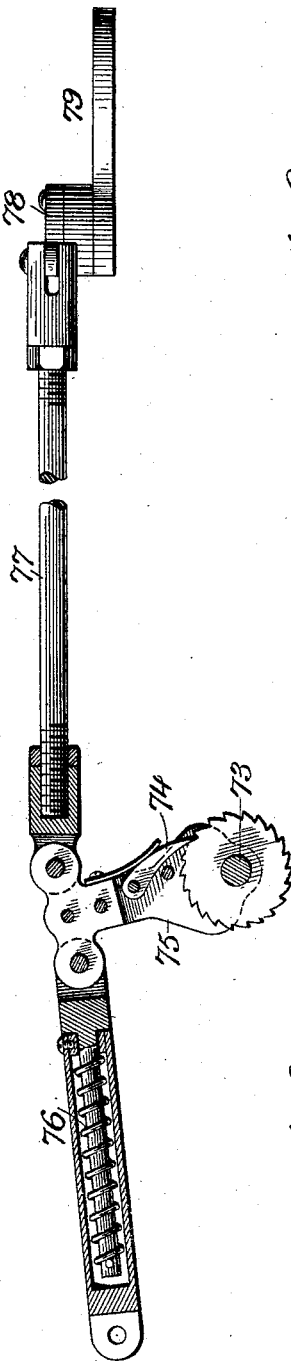
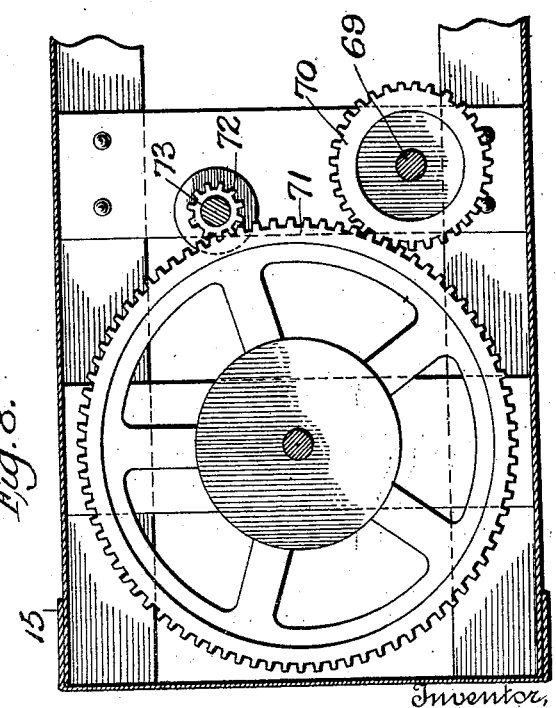

W. A. OLSEN.
NAILING MACHINE.
APPLICATION FILED JUNE 28, 1907.

916,768.

Patented Mar. 30, 1909.
6 SHEETS—SHEET 6.

Witnesses:
James P. Duhamel
H. G. Dieterich

Inventor,
William A. Olsen,
By his Attorney Victor J. Evans

UNITED STATES PATENT OFFICE.

WILLIAM A. OLSEN, OF NEW YORK, N. Y.

NAILING-MACHINE.

No. 916,768.   Specification of Letters Patent.   Patented March 30, 1909.

Application filed June 28, 1907. Serial No. 381,261.

*To all whom it may concern:*

Be it known that I, WILLIAM A. OLSEN, a citizen of the United States, residing at New York, in the county of New York and State of New York, have invented new and useful Improvements in Nailing-Machines, of which the following is a specification.

This invention relates to nailing machines designed particularly for nailing down flooring sections, blocks and planks, said machine embodying means for primarily arranging the nails in their proper position, feeding the same toward a driving element and delivering them one at a time to the action of the driving element which is adapted to be struck by a suitable implement such as a mallet to drive the nail at the desired point in the flooring. Means are also provided for effecting the automatic separation and feeding of the nails, and the intermittent delivery of the same embodying mechanism driven by the carrying wheels on which the machine is mounted, as fully explained hereinafter and pointed out in the claims.

Figure 1:
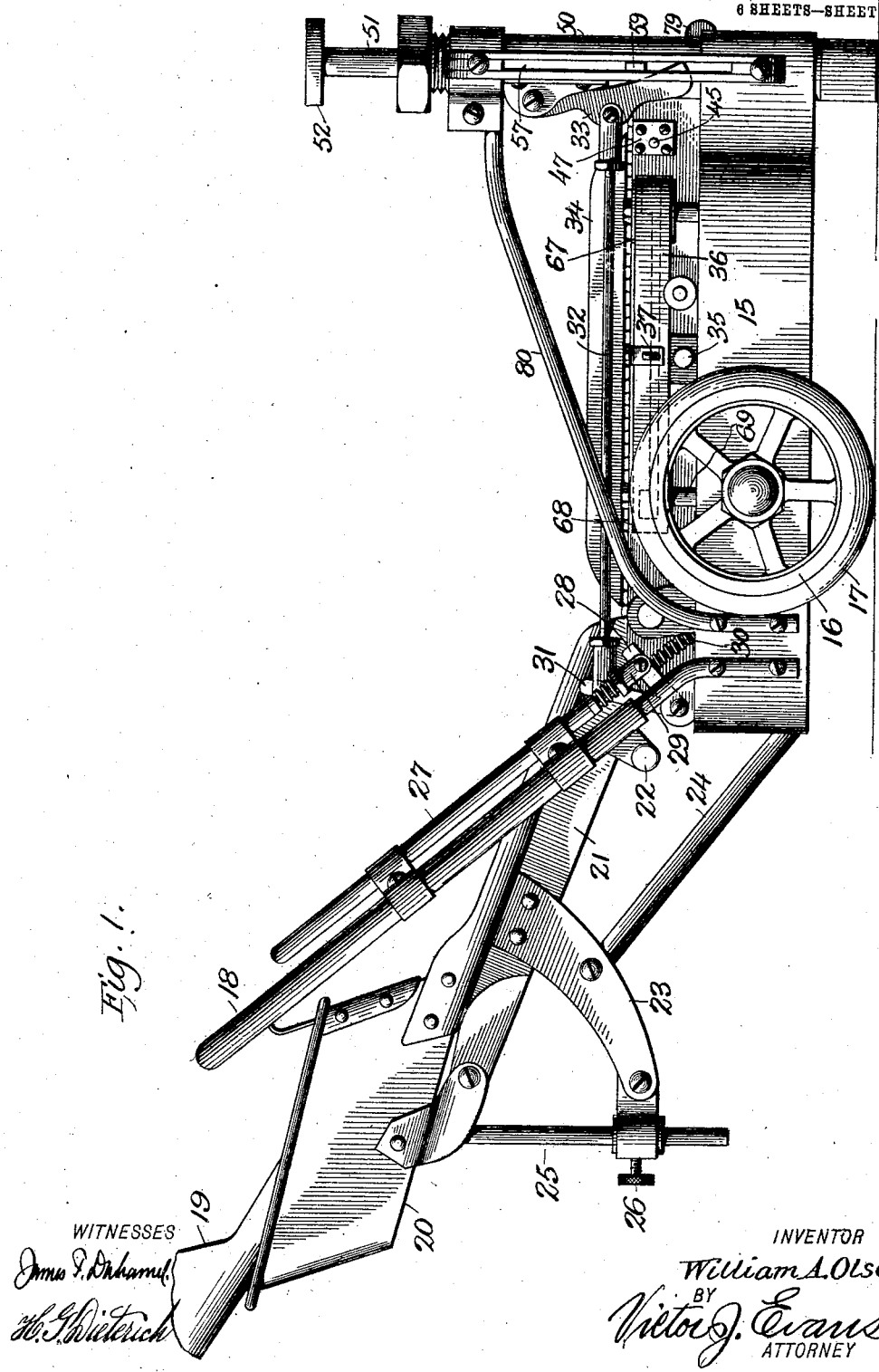
Figure 2:
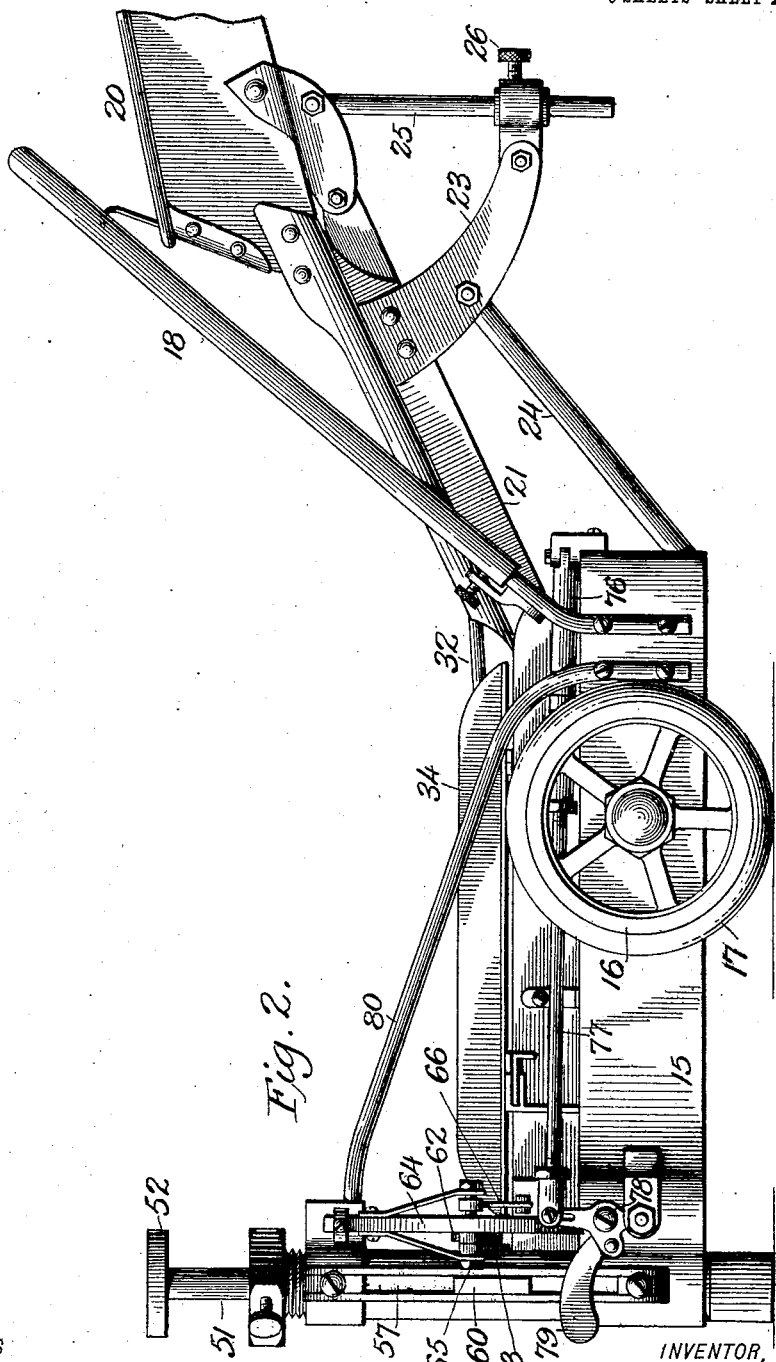
Figure 3:
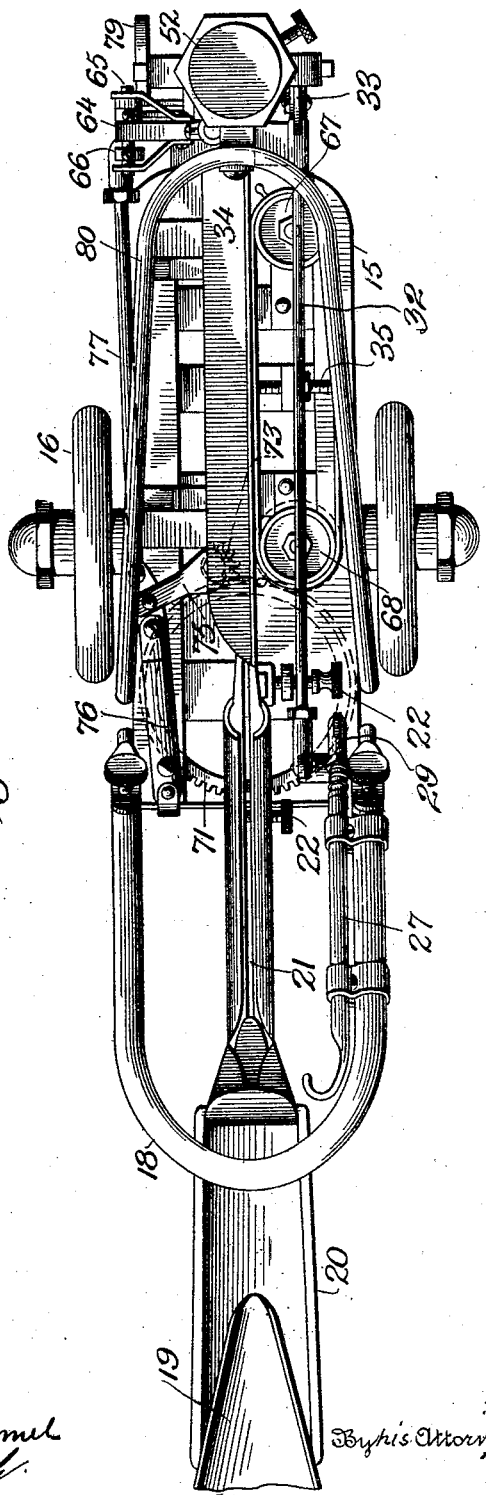
Figure 4:
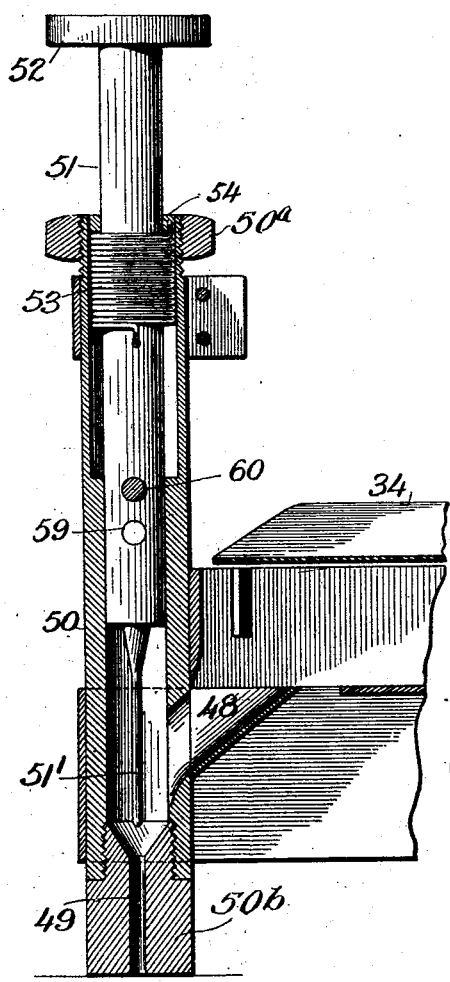
Figure 5:
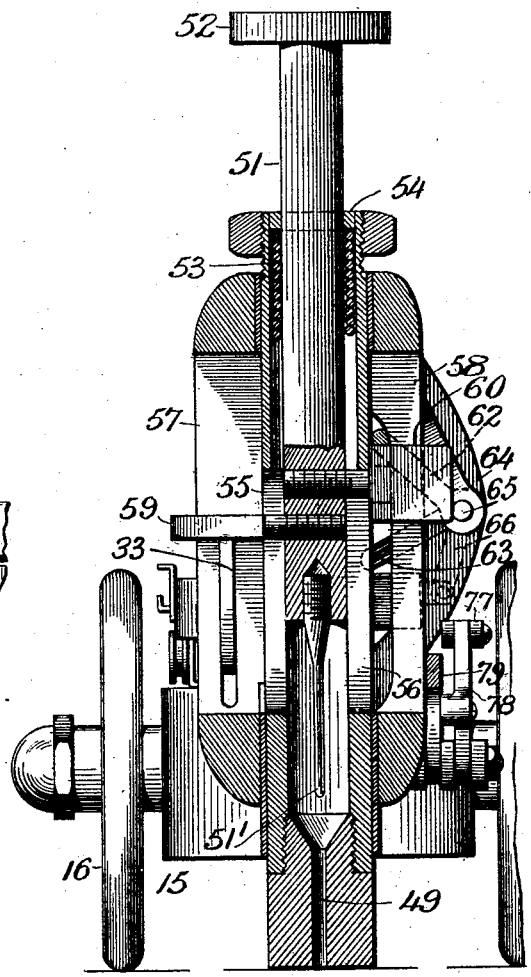
Figure 6:
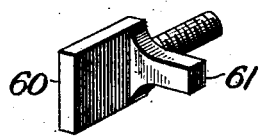
Figure 10:
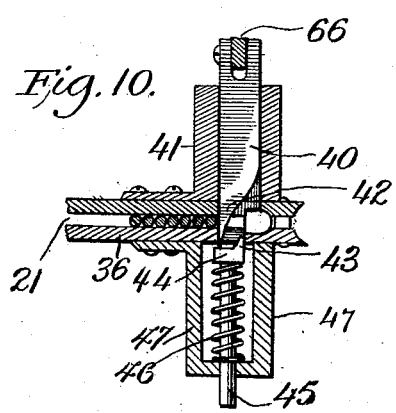
Figure 11:
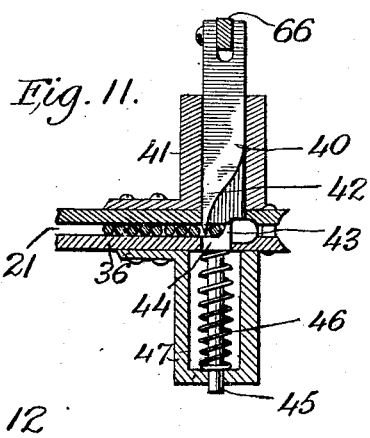
Figure 12:
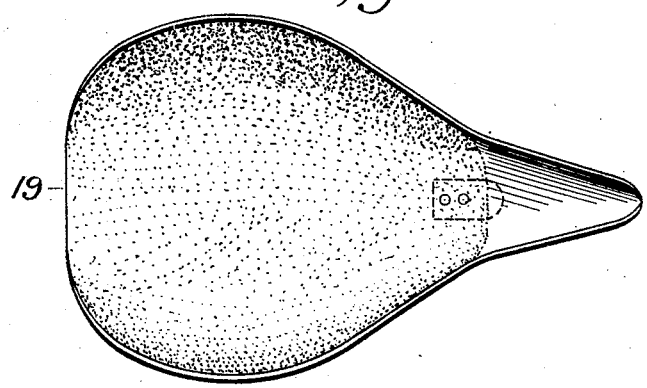
Figure 13:
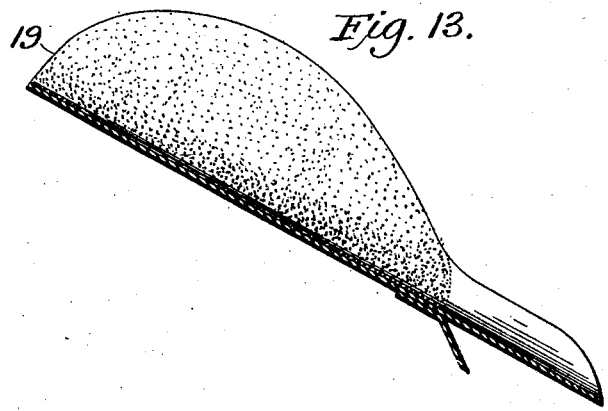

In the accompanying drawings:—Figure 1 is a side elevation of the improved nailing machine. Fig. 2 is a similar view looking from the other side. Fig. 3 is a plan view of the machine. Fig. 4 is an enlarged vertical sectional view of the front end of the machine, showing the driving mechanism. Fig. 5 is a similar view at right angles to Fig. 4, showing the driver partly in section. Fig. 6 is a detail view of the nail separator actuating arm. Fig. 7 is a detail view of part of the nail feeding mechanism. Fig. 8 is a top plan view of the drive gearing for the nail-feeding belt. Fig. 9 is a vertical cross section through the nail runway and nail feeding belt. Fig. 10 is a detail vertical section through the nail separating mechanism. Fig. 11 is a similar view showing the separator in a different position. Fig. 12 is a plan view of the nail chute. Fig. 13 is a vertical sectional view of the same.

The machine contemplated in this invention is particularly adapted for use in nailing down flooring of thin wood or parquetry, but it is obvious that the machine may be utilized for heavier work. The machine is designed to be moved along the flooring and positioned at the points where the nails are to be driven.

The machine comprises a frame or truck 15 which is mounted on wheels 16 having rubber tires 17 and mounted on stud axles at opposite sides of the truck, the latter being provided at the rear with a handle 18 of any desired length for pushing the truck in the direction of the work to be done. At the rear end of the truck is also situated a chute 19 set at a forwardly pitched angle and roughened on its upper face by means of a layer of sand-paper or by similar means so that when a supply of nails is dumped on the chute the heads thereof are retarded causing the nails to slide point downward into the hopper 20 and then one by one into a narrow runway 21 which may be adapted by means of a screw 22 to nails of different sizes. The runway, hopper and chute are all supported by a bracket 23 and brace 24 and the said hopper and chute are rendered adjustable as to their angle of inclination by means of a post 25 adapted to be held at any desired point of adjustment by means of the set screw 26 and carried by a sleeve pivotally mounted on said bracket, the post 25 being adjustable through said sleeve.

Supported by the handle 18 is a sliding rod 27 connected with one arm 28 of a bell crank lever by an adjustable fork 29 and the bell crank is held normally in the position shown by the spring 30 while its other arm 31 carries one end of a rod 32 running to the forward end of the truck where it is connected with and operates a latch 33.

The runway 21 extends forward to the front end of the machine and it is covered with a guard plate 34 to prevent the heads of the nails which hang vertically from riding out of the slot and also prevent the entrance of larger or ill shaped nails into the runway, and one of the walls 36 of the slot is movable toward and away from the opposite wall and provided at one or more points near the forward end with adjusting screws 35 for regulating the width of the runway. The wall 36 of the runway is slotted lengthwise as clearly shown in Fig. 9 and in this slot travel fingers 37 carried by an endless nail feeding belt 38 which fingers engage the nails a short distance below the heads thereof and propel them along the runway. Additional fingers 39 overhang the raceway and engage the heads of the nails and when the nails reach the forward end of said runway they are engaged and each nail held for a short interval by the nail separating device illustrated in Figs. 10 and 11. This separating device consists of a separator or plunger 40 sliding in a guide 41 and having a pointed end 42 adapted to force its way between the nails and separate the last nail from its companion. In separating the nail, the plunger by reason of an inclined shoulder at its point forces a nail forward past the detaining shoulder 43 of a spring pressed plate 44 having a stem 45 encircled by the spring 46 and working in a guide 47 on the other side of the raceway from the guide 41. The release of the nail is effected by the simultaneous movement of the plunger 40 and plate 44, the plunger shoulder forcing the nail by the displaced shoulder 43, when said nail falls into an inclined chute 48, shown in Fig. 4, from whence it drops into the vertical throat or orifice 49 at the base of the head 50. The chute 48 communicates with the interior of the head 50 and the entrance to the throat or orifice 49 is funnel shaped. The upper part of the head carries a driver 51 having an impact head 52 and said driver is held normally elevated by means of a spring 53 which encircles it, one end of the spring being secured to the driver while the other end is attached to a collar 54 fitted in the top of the head. The lower end of the driver carries a pin 51' which enters the orifice 49 to drive the nail. At each side of the head are slots 55 and 56 and guideways 57 and 58, (Figs. 1, 2 and 5), the point of the latch 33 working in the guideway 57. Projecting from the side of the driver 51 and into the slot 55 and guideway 57 is a pin 59 which is intercepted by the latch 33 when the driver is down, the driver being held in its depressed position by the latch 33 until released by the operating rod 27. Projecting from the opposite side of the driver is an arm 60, playing in the slot 56 and having a lateral shoulder or pin 61, shown in Figs. 5 and 6, and this pin 61 alternately engages the arms 62 and 63 of a bell crank lever pivoted in a bracket 64 to operate the nail separator. The pivoted shaft 65 of this bell crank lever carries an arm 66 which is attached to the separator 40 and thus one nail is fed forward at each stroke of the plunger 51.

The belt 38 which is secured to the fingers 37 and 39 is carried by pulleys 67 and 68, the latter being at the upper end of a vertical shaft 69 journaled in the truck and having at its lower end a gear wheel 70 meshing with and driven by a larger wheel 71 which is driven by a pinion 72 on a vertical shaft 73, as shown in Fig. 8. This shaft 73 is driven by the means shown in Figs. 2, 3, and 7, and which consists of a ratchet wheel on the shaft 73 operated by a pawl 74 pivoted in a yoke 75 journaled on the shaft and straddling the ratchet wheel. One side of the yoke is connected with a tension spring 76 to cause its recoil to the position shown while the other side is connected with a rod 77 which connects with a bell crank lever 78, one of the arms 79 of which lies in the path of the arm 60 as the latter descends when a blow is struck the driver 50.

From the above description which has also included most of the operation of the machine it will be seen that when the nails are dumped on the chute they properly position themselves to fall into the raceway, point first, and they are moved along by the fingers of the feeding belt and delivered, one by one, to the orifice beneath the driver. The machine is advanced along a floor after the sections thereof are laid and the driver is positioned over the point where a nail is to be driven. As the driver is struck and depressed, it is caught by the latch 33; at the same time the plate 60 and its pin 61 operate on the arm 63 to retract the separator plunger 40 to the position shown in Fig. 11 permitting the line of nails to rest against the shoulder 43 until the separator again moves forward to separate the last nail from the balance. The downward movement of the driver also depresses the arm 79 and through the ratchet and gearing described advances the nails along the raceway. Upon the release of the latch 33, the spring 53 retracts the driver and its driving pin and in such return movement the separator 40 is moved to the position shown in Fig. 10 when it pushes plate 44 and shoulder 43 out of the way and releases the last nail held thereby, which nail drops beneath the pin 51'.

In order to strengthen the head 50, braces 80 may be used to connect the same with the truck frame and various other means may be resorted to for strengthening the machine.

In order to regulate the play of the driver 51 so that it will set the nail in the flooring any desired depth, the upper end of the head 50 carries a nut $50^a$ which is adjustable thereon and forms a stop for the head 52 thus shortening or lengthening its stroke. The base $50^b$ of the head 50 is also adjustable being secured to the head by a screw-threaded joint and the adjustment of either of these pieces $50^a$ and $50^b$ in the proper direction will prevent the setting of the nail too deeply into the flooring or permit the driving by the pin 51' to the maximum depth.

I claim:—

1. In a machine of the class described, a nail hopper having a uniformly rough surface designed to retard the movement of the nail heads.

2. In a machine of the class described, a nail hopper having a uniformly rough concaved nail supporting surface designed to retard the movement of the heads of the nails.

3. In a machine of the class described, the combination of a frame, a nail hopper, a head embodying a throat, a runway leading from the hopper to the throat and provided with a slot extending lengthwise thereof, a nail feeder consisting of an endless belt provided with nail engaging fingers which work through said slot, a nail separator, and a nail driver.

4. In a machine of the class described, the combination of a frame, a nail hopper, a head embodying a throat, a runway leading from the hopper to the throat and provided with a slot extending lengthwise thereof, a nail feeder consisting of an endless belt provided with nail engaging fingers which work through said slot, and other fingers operating above the runway and acting on the nail heads, a nail separator, and a nail driver.

5. In a machine of the class described, the combination of a frame, a nail hopper, a head embodying a throat, a runway leading from the hopper to the throat, a nail feeder consisting of an endless belt provided with nail engaging fingers, pawl and ratchet mechanism for actuating said belt including a lever, a nail separator, and a nail driver provided with means for operating said lever.

6. In a machine of the class described, the combination of a frame, a nail hopper, a head embodying a throat, a runway leading from the hopper to the throat, a nail feeder consisting of an endless belt provided with nail engaging fingers, pawl and ratchet mechanism for actuating said belt including a lever, and a spring retracted pawl carrying member, a nail separator, and a nail driver provided with means for operating said lever.

7. In a machine of the class described, the combination of a frame, a nail hopper, a head embodying a throat, a runway leading from the hopper to the throat, a nail feeder, a nail separator comprising a plunger having an inclined shoulder, a receding stop shoulder actuated by contact with the point of said plunger, a nail driver, and means for operating the plunger including a lever connected with said plunger, and means on the driver arranged to swing said lever.

In testimony whereof, I affix my signature in presence of two witnesses.

WILLIAM A. OLSEN.

Witnesses:
HUGH McMANUS,
MARTIN J. McGOWAN.